United States Patent
Jang et al.

(10) Patent No.: US 7,564,611 B2
(45) Date of Patent: Jul. 21, 2009

(54) ELECTRODE COMPRISING LITHIUM NICKEL OXIDE LAYER, METHOD FOR PREPARING THE SAME, AND ELECTROCHROMIC DEVICE COMPRISING THE SAME

(75) Inventors: Ki Seok Jang, Daegu (KR); Jae Duk Park, Daejeon (KR); Jae Seung Oh, Seoul (KR); Jin Young Park, Naju-si (KR); Shin Jung Choi, Daejeon (KR); Won Jong Kwon, Daejeon (KR); Byoung Bae Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 235 days.

(21) Appl. No.: 11/650,992

(22) Filed: Jan. 9, 2007

(65) Prior Publication Data

US 2007/0160907 A1    Jul. 12, 2007

(30) Foreign Application Priority Data

Jan. 9, 2006    (KR) ............... 10-2006-0002190

(51) Int. Cl.
*G02F 1/15* (2006.01)
*G02F 1/1335* (2006.01)

(52) U.S. Cl. .................... 359/265; 349/105
(58) Field of Classification Search ......... 359/265–270, 359/272–275, 277, 245–247, 254; 345/49, 345/105; 349/182–186; 348/814; 250/70; 438/929

See application file for complete search history.

(56) References Cited

U.S. PATENT DOCUMENTS

| 4,229,080 | A | 10/1980 | Take et al. |
| 5,307,201 | A | 4/1994 | Passerini et al. |
| 6,859,297 | B2 | 2/2005 | Lee et al. |
| 2003/0036002 | A1* | 2/2003 | Yoshida et al. ............... 429/247 |

FOREIGN PATENT DOCUMENTS

| JP | 56-033627 | 4/1981 |
| JP | 04-188114 | 7/1992 |
| KR | 100196009 B1 | 2/1999 |
| KR | 1020030040653 A | 5/2003 |

* cited by examiner

*Primary Examiner*—Scott J Sugarman
*Assistant Examiner*—Dawayne A Pinkney
(74) *Attorney, Agent, or Firm*—McKenna Long & Aldridge LLP

(57) ABSTRACT

The present invention provides A method for preparing an electrode containing lithium nickel oxide wherein nickel has a single oxidation number, which comprises the following steps: a) preparing an electrode containing the lithium nickel oxide ($Li_xNi_{1-y}O$, $0.4<x<1$, $0<y<1$) layer formed on the conductive substrate; and b) applying oxidative voltage to the electrode, and then applying reductive voltage thereto, an electrode prepared by the method and an electrochromic device containing the same.

The electrode containing the lithium nickel oxide layer of the present invention exhibits wider optical electrochromic range and fast reaction speed, so that it can contribute to improving electrochromism and other optical properties of an electrochromic device.

18 Claims, 1 Drawing Sheet

ELECTRODE COMPRISING LITHIUM NICKEL OXIDE LAYER, METHOD FOR PREPARING THE SAME, AND ELECTROCHROMIC DEVICE COMPRISING THE SAME

This application claims the benefit of the filing date of Korean Patent Application No. 2006-2190, filed on Jan. 9, 2006, in the Korean Intellectual Property Office, the disclosure of which is incorporated herein in its entirety by reference.

TECHNICAL FIELD

The present invention relates to an electrode comprising the lithium nickel oxide layer, which is available for an oxidative electrode of an electrochromic device, and method for preparing the same.

BACKGROUND ART

Electrochromism means the phenomenon by which color changes according to a potential difference of an applied electric field. The most representative electrochromic materials are such inorganic metal oxides as $WO_3$, $Ir(OH)_x$, $MoO_3$, $V_2O_5$, $TiO_2$, $NiO$ and $LiNiO_2$, and such organic compounds as viologen, anthraquinone, phenothiazine, polyaniline, polypyrrole and polythiophene. The electrochromism was first found in 1961, however no electrochromic devices have been commercially mass-produced so far because of disadvantages of difficulty in multiple color expression, low speed of coloring and decoloring, an after-image remaining after decoloring, and decomposition of an organic compound by the repeated coloring-decoloring.

To overcome the problems of using an organic compound for the device, an inorganic metal oxide has been used as an electrochromic material as an alternative. Owing to the inorganic metal oxide, life-time, UV stability and coloring-decoloring speed have been significantly improved. $WO_3$, one of the representative inorganic metal oxides, is colorless in oxidation state and is colored in reduction state, so that studies have been going on about $WO_3$ as a promising electrochromic material for a reductive electrode.

The inorganic electrochromic material for an oxidative electrode is exemplified by Ce—$TiO_2$, ATO (Sb-doped $SnO_2$), NiO, $Li_xNi_{1-y}O$, etc. However, with these inorganic electrochromic materials, the sol-gel reaction temperature has to be 400° C. or higher, actuation voltage in the device is high, coloring-decoloring speed is very slow, and optical properties are not very good. In the meantime, lithium nickel oxide ($Li_xNi_{1-y}O$) has high transmittance, excellent electrochromic property, low driving voltage and fast reaction speed, so that recent studies have been focused on it as an electrochromic material for an oxidative electrode. The structural analysis of the lithium nickel oxide ($Li_xNi_{1-y}O$) synthesized by sol-gel reaction has already been made and thus the mechanism of coming in and out of $Li^+$ and the structural change thereby have been reported.

The lithium nickel oxide ($Li_xNi_{1-y}O$) is generally prepared by sol-gel reaction, sputtering or pulse laser deposition, etc. Even though, lithium nickel oxide produced by one of these methods is good enough for the use as an electrochromic material, it still has a few problems for being used as an electrochromic material formed on the conductive substrate.

First, $Ni^{2+}$ and $Ni^{3+}$ are co-existed in the structure of the lithium nickel oxide ($Li_xNi_{1-y}O$) electrode prepared by sputtering, making it unstable. So, if this lithium nickel oxide is used as a electrochromic material for an electrochromic device, the electrochromic range will be very narrow since the lithium nickel oxide will not be completely oxidized or reduced. In particular, incomplete reduction makes matter worse with making the product still colored and unclear. Therefore, after assembling an oxidative electrode containing the lithium nickel oxide ($Li_xNi_{1-y}O$) layer with the reductive electrode to prepare electrochromic device, it is required to apply oxidative-reductive voltage repeatedly on the electrochromic device prepared thereby in order to decolor the lithium nickel oxide ($Li_xNi_{1-y}O$) completely. But, if the lithium nickel oxide ($Li_xNi_{1-y}O$) layer is approximately 150 nm or more in thickness, hundreds of oxidative-reductive voltage applications are required to decolor the lithium nickel oxide ($Li_xNi_{1-y}O$) completely. Even after hundreds of decolorization processes, complete decolorization is not guaranteed.

Besides, the lithium nickel oxide ($Li_xNi_{1-y}O$) deposited by sputtering method exhibits poor adhesion onto the surface of FTO (Fluorine-doped Tin Oxide) glass. Owing to repeated oxidation-reduction after completing the electrochromic device, the deposited lithium nickel oxide is changed into $NiO_x$ or NiOOH, which is then separated from the electrode surface or generates air bubbles in electrolytes.

DISCLOSURE OF THE INVENTION

The present inventors found out that an electrode having a wide photochromic range can be prepared by treating electrochemically the electrode containing the lithium nickel oxide ($Li_xNi_{1-y}O$) layer before completing the electrochromic device in order for nickel (Ni) in the lithium nickel oxide to have a single oxidation number.

Thus, it is an object of the present invention to provide an electrode containing the lithium nickel oxide ($Li_xNi_{1-y}O$) layer which has been treated electrochemically before completing the electrochromic device in order for nickel in the lithium nickel oxide to have a single oxidation number, a method for preparing the same and an electrochromic device containing the same.

The above object and other objects of the present invention can be achieved by the following embodiments of the present invention.

To achieve the above objects, the present invention provides a method for preparing an electrode containing lithium nickel oxide wherein nickel has a single oxidation number, which comprises the following steps: a) preparing an electrode containing the lithium nickel oxide ($Li_xNi_{1-y}O$, $0.4<x<1$, $0<y<1$) layer formed on the conductive substrate; and b) applying oxidative voltage to the electrode, and then applying reductive votage thereto.

The present invention also provides an electrode containing the lithium nickel oxide layer formed on the conductive substrate, in which nickel of the lithium nickel oxide characteristically has a single oxidation number.

The present invention further provides an electrochromic device comprising a) the first electrode; b) the second electrode; c) an electrochromic material; and d) electrolyte, wherein the first electrode or the second electrode is as described above.

Hereinafter, the present invention will be explained in more detail.

From the investigation of electrochromism of lithium nickel oxide, it was confirmed that coloring-decoloring depends on the oxidation state of Ni ion, precisely when Ni is in oxidation state ($Ni^{3+}$), coloring is induced, and when Ni is in reduction state ($Ni^{2+}$), decoloring is induced.

The electrode containing the lithium nickel oxide ($Li_xNi_{1-y}O$) layer prepared by one of the conventional methods such as sputtering, sol-gel reaction or pulsed laser deposition, is primarily colored and has $Ni^{2+}$ and $Ni^{3+}$ together in its structure, suggesting that oxidation-reduction does not occurred sufficiently. In particular, $Ni^{2+}$ mainly causes troubles, when $Ni^{2+}$ and $Ni^{3+}$ coexist in the inner structure of lithium nickel oxide, $Ni^{2+}$ takes the places of $Ni^{3+}$ and $Li^+$ so that it interrupts the insertion of $Li^+$ from the outer side into the electrode.

According to the present invention, stoichiometric structure can be obtained in lithium nickel oxide ($Li_xNi_{1-y}O$) before completing the electrochromic device. So, $Ni^{2+}$ does not coexist with $Ni^{3+}$ in lithium nickel oxide and nickel has only a single oxidation number. The electrochromic device using the above material as a electrochromic material exhibits best optical and electrochromic properties resulted from the complete oxidation-reduction.

For example, $Ni^{2+}$ in lithium nickel oxide ($Li_xNi_{1-y}O$) is oxidized into $Ni^{3+}$ completely to make $Li_{0.5}Ni_{0.5}O$ structure, and then $Li^+$ can be introduced to prepare a colorless transparent electrode of $Li_2NiO_2$. Particularly, if oxidative voltage is applied to the lithium nickel oxide ($Li_xNi_{1-y}O$) having both $Ni^{2+}$ and $Ni^{3+}$ to change $Ni^{2+}$ into $Ni^{3+}$ completely, and then Reductive voltage is applied to the lithium nickel oxide in electrolyte containing $Li^+$ to introduce $Li^+$ into the oxide, such a colorless transparent electrode of lithium nickel oxide can be obtained. This process is referred as 'formatting' in this invention.

The conventional approach to solve the above problem is that an oxidative electrode and a reductive electrode are assembled to prepare an electrochromic device, followed by repeated application of oxidative-reductive voltage (coloring/decoloring of the device). However, the problem of this conventional method is that even after hundreds of repeated application of oxidative-reductive voltage, the complete decoloring is not achieved when the thickness of lithium nickel oxide ($Li_xNi_{1-y}O$) is 150 nm or more. In addition, the application of oxidative-reductive voltage to the finished electrochromic device is not-efficient because the application and other conditions are limited owing to the characteristics of the electrolyte or the device itself.

According to the present invention, formatting of the electrode which is performed before completing the electrochromic device, results in less limitation in applied voltage and treatment conditions, compared with applying oxidative-reductive voltage repeatedly after the completion of the device. So, according to the present invention, nickel ions ($Ni^{2+}$, $Ni^{3+}$) are completely oxidized and reduced regardless of the thickness of an electrochromic material.

The formatting of the electrode containing the lithium nickel oxide ($Li_xNi_{1-y}O$) layer makes nickel therein to have a single oxidation number. So, even though the thickness of the lithium nickel oxide layer is 150 nm or more, oxidation-reduction is completed to give excellent electrochromic property.

The preferable thickness of the lithium nickel oxide ($Li_xNi_{1-y}O$) layer formed on the conductive substrate and acting as an electrode is 150 nm~10 μm.

The electrode containing the lithium nickel oxide wherein nickel has a single oxidation number can be prepared by the method comprising the following steps;

a) preparing an electrode containing the lithium nickel oxide ($Li_xNi_{1-y}O$, $0.4<x<1$, $0<y<1$) layer formed on the conductive substrate; and b) applying oxidative voltage to the electrode, and then applying reductive voltage thereto.

The above step a) can be performed by one of the conventional methods known to those in the art, for example sputtering, sol-gel reaction, pulse laser deposition, etc.

In step b), the electrode containing the lithium nickel oxide ($Li_xNi_{1-y}O$) layer on the conductive substrate can be used as a working electrode and application of oxidative-reductive voltage can be repeated alternately in an electrochemical cell equipped with electrolyte containing lithium ion ($Li^+$) and a reductive counter electrode.

Herein, oxidative voltage for electrochemical treatment indicates that (+) voltage is applied to the working electrode containing the lithium nickel oxide layer to oxidize Ni and reductive voltage indicates that (−) voltage is applied to the working electrode to reduce Ni.

During the formatting, oxidative voltage is preferably 1 V~3.2 V and reductive voltage is preferably −1 V~−2.7 V. The maximum strength of applicable voltage depends on the thickness of an electrode. When an electrode is oxidized, $Ni^{3+}$ can be generated fast with the applied voltage of 3.0 V or higher. But, if the applied voltage is higher than 3.2 V, the electrode may be decomposed by the excessive voltage. Likewise, reductive applied voltage has to be determined by considering the thickness. And if at least −2.7 V of reductive voltage is applied, side-reaction may be induced on the electrode. The voltage level applied for oxidation-reduction is related to the time for completing formatting. The higher the applied voltage, the faster the formatting is completed. At this time, side-reaction might be induced in the electrode material. But, it is preferred that formatting is completed within a short period of time for efficiency with maximum voltage application with minimum side-reaction or electrode material decomposition. And at this time oxidation-reduction can be repeated less than 10 times not to reduce long-term durability. Oxidative-reductive voltage applied to the finished electrochromic device has to be enough voltage for the electrochromic material to cause color change but it has to be within the range of electrochemical window of electrolyte and at the same time enough to endure ten thousands of repeated application. If the actuation voltage of a device is at least 1.7 V, electrolyte decomposition will be accelerated to generate air bubbles. However, the formatting of the present invention is distinguished from the conventional method in which oxidation-reduction of lithium nickel oxide is carried out at higher voltage.

The counter electrode forming the electrochemical cell is a reductive electrode, which is exemplified by platinum (Pt), tungsten oxide ($WO_3$), and lithium foil, but not always limited thereto.

The electrolyte forming the electrochemical cell is a material that contains lithium ion ($Li^+$), and the source of the lithium ion is exemplified by $LiCLO_4$, $LiPF_6$, LiTFSI (lithium trifluoromethanesulfonimide), LiI, $LiBF_4$, etc, but not always limited thereto. The electrolyte solvent is selected from a group consisting of propylene carbonate, acetonitrile, 7-butyrolatone, methoxypropionitrile, 3-ethoxypropionitrile and triethylene glycol dimethyl ether, but not always limited thereto. The diffusion speed of Li ion in the electrolyte is faster with the increase of the temperature of the electrolyte during formatting. So, it is preferred to performing formatting at as high temperature as possible, as long as it is below the boiling point or decomposition temperature of the electrolyte solvent, which means formatting can be completed much faster. The temperature of electrolyte for formatting depends on the kind of electrolyte solvent. But, the temperature is not fixed specifically as long as it is below the boiling point or decomposition temperature of the electrolyte solvent. For example, when propylenecarbonate is used as electrolyte, the preferable temperature of electrolyte for formatting can be 15~120° C.

In step b), it is important to give enough time for application of oxidative-reductive voltage, so that the electrode can be completely oxidized or reduced for nickel to have a single oxidation number in the lithium nickel oxide. The complete oxidation-reduction can be judged by observing complete decoloring on the electrode after reduction.

The complete decoloring of the electrode after reduction can be determined by measuring the light transmittance of the electrode. And when the light transmittance is at least 80% at 500 nm wavelength, it is judged that reduction is completely induced.

In General, when an electrode is assembled to an electrochromic device, the transmittance of electrochromic device is lowered comparing to that of electrode. So, even though the electrode is completely reduced by the formatting of the present invention to have the transmittance of 80% or more, the transmittance of electrochromic device using the same may be less than 80%.

The duration of the voltage application for complete oxidation-reduction depends on the thickness of the lithium nickel oxide layer formed on the electrode, and 10 seconds~30 minutes are preferred. After the application of oxidative voltage, reductive voltage is applied, during which decoloring is induced. But after the first application of oxidative-reductive voltage, if the decoloring is not completely performed, the application process might be repeated twice, three times, or more until complete decoloring. Once complete decoloring is confirmed, it is judged that nickel in the lithium nickel oxide has a single oxidation number.

The acceptable repeated numbers of times for the oxidative-reductive voltage application is 1~50 times, and 1~10 times is more preferred.

Meanwhile, if the adhesion between the conductive substrate and the lithium nickel oxide ($Li_xNi_{1-y}O$) layer is weak, the layer will be separated or air bubbles will be generated after repeated voltage application. This problem can be solved by the additional step of heat-treatment in between step a) and step b), and at this time, heat-treatment is preferably performed at 100~350° C. for 30 minutes~3 hours.

The electrochromic device of the present invention comprises the first electrode and the second electrode on its transparent or semitransparent substrate, and electrolyte as well. And the first electrode, the second electrode, electrolyte or their combination might include an electrochromic material.

The conductive substrate on the first electrode or the second electrode or both might be a transparent conductive film formed on the transparent substrate. The materials for the conductive film can be selected from a group consisting of a thin film of metal such as Ag or Cr; metal oxide such as tin oxide, zinc oxide, ITO (indium tin oxide), FTO (fluorine doped tin oxide) and IZO (indium zinc oxide); and a mixture thereof, but not always limited thereto. The transparent electrode film can be formed by any conventional method known to those in the art without limitation, for example vacuum vapor deposition, ion plating, electron-beam vapor deposition, sputtering, etc.

The electrochromic device of the present invention can be prepared by any conventional method known to those in the art. According to an exemplary embodiment of the present invention, the first electrode and the second electrode are assembled by using an adhesive containg spacer, leaving a part for injecting electrolyte. After injecting electrolyte, the input area is sealed.

According to the present invention, a eutectic mixture, which has never been used for the conventional electrochromic device, can be used as a component forming electrolyte of the electrochromic device. In general, the eutectic mixture includes at least two different materials, so that the melting temperature thereof is lowered. This mixture is particularly liquid phase at room temperature. The room temperature herein means up to 100° C. or up to 60° C.

The electrolyte containing the eutectic mixture of the present invention exhibits wider potential window, compared with conventional organic solvents and ionic liquids, owing to the stability of the eutectic mixture, suggesting that wide range of applicable voltage is accepted. In addition, this mixture exhibits no vapor pressure, unlike the conventional solvents, resulting in no worry about evaporation and exhaustion of electrolyte. The eutectic mixture of the invention also shows flame resistance, so that it can increase the stability of a product. The eutectic mixture itself is very stable, in which side-reaction is inhibited in the device and high quality is guaranteed by high conductivity.

The eutectic mixture of the present invention can be the eutectic mixture of an amide compound and a salt enabling ionization, and a preferable example is represented by the following formula 1.

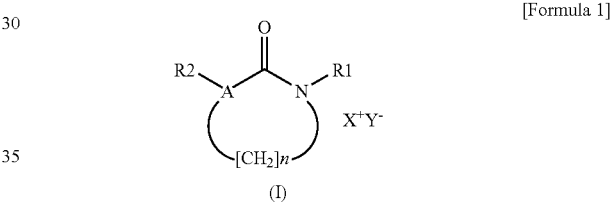

[Formula 1]

Wherein,

R1 is H, $C_1$-$C_{20}$ alkyl, $C_1$-$C_{20}$ alkylamine, alkenyl, aryl or alaryl; R2 is H, halogen, $C_1$-$C_{20}$ alkyl, alkenyl, aryl or alaryl; A is C, O, H or N; X is one or more metal cations or organic cations selected from a group consisting of alkaline metal, alkaline earth metal, transition metal, metalloid, lanthanides and actinoids; Y is one or more anions making salt by reacting with the X; and n is an integer of 0-10.

In the compound of formula 1, the cation X is preferably tetraammonium, magnesium, sodium, potassium, lithium or calcium, and the anion Y is preferably thiocyanate, formate, acetate, nitrate, perchlorate, sulfate, hydroxide, alkoxide, halide, carbonate, oxalate or tetrafluoroborate.

The electrochromic device of the present invention can be applied to various fields requiring various electrochemical properties, for example, automobile mirrors, smart windows, sun-roofs, and displays, but not always limited thereto.

BRIEF DESCRIPTION OF THE DRAWINGS

The application of the preferred embodiments of the present invention is best understood with reference to the accompanying drawings, wherein.

MODE FOR CARRYING OUT THE INVENTION

Figure 1:
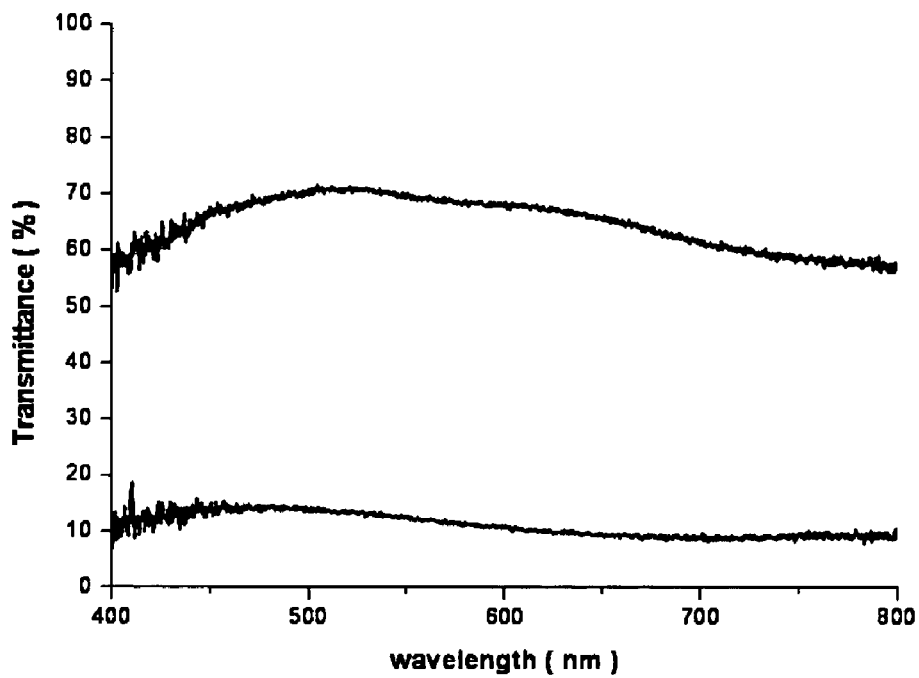
FIG. 1 is a graph showing the transmittance change of the electrochromic device (the thickness of lithium nickel oxide is 300 nm) prepared in Example 1.
Figure 2:
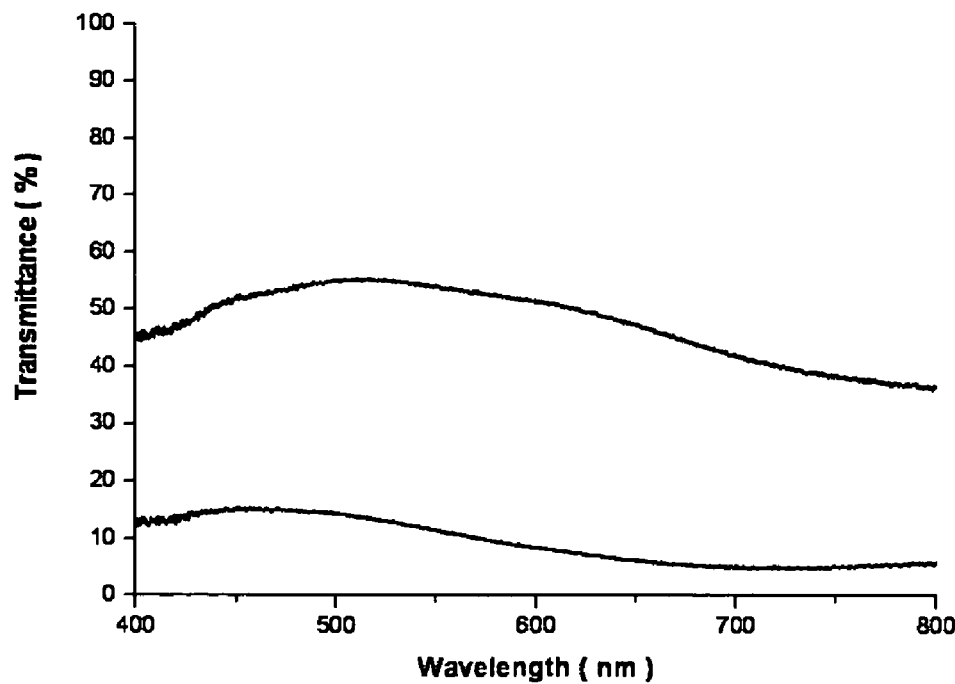
FIG. 2 is a graph showing the transmittance change of the electrochromic device (the thickness of lithium nickel oxide is 300 nm) prepared in Comparative Example 1.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

The lithium nickel oxide ($Li_xNi_{1-y}O$) thin layer was deposited on the glass substrate on which FTO transparent conductive film was formed by using sputtering from $LiNiO_2$ target. To improve the adhesion between the FTO glass substrate and the electrochromic material, they were treated with heat for 30 minutes at 300° C., followed by slow cooling. Formatting of the lithium nickel oxide ($Li_xNi_{1-y}O$) was performed in a glove box by using platinum as a counter electrode in propylene carbonate electrolyte (temperature: 60° C.) containing 1 M $LiCLO_4$. After completing oxidization of the deposited lithium nickel oxide ($Li_xNi_{1-y}O$) of 200 nm in thickness, reductive voltage was applied thereto to give a colorless transparent lithium nickel oxide thin layer. When formatting was performed at the oxidative-reductive applied voltage (2.0 V/−2.0V), the transmittance of the electrode containing the colorless transparent lithium nickel oxide layer was 5~76%. The formatted lithium nickel oxide electrode was used as an oxidative electrode and a tungsten oxide ($WO_3$) (thickness: 300 nm) electrode was used as a reductive electrode to prepare an electrochromic device. The two electrodes were facing each other and assembled by using a UV hardener, to which propylene carbonate electrolyte containing 1 M $LiClO_4$ was injected. Then, the inlet was sealed with the UV hardener and as a result, the electrochromic device of the invention was prepared. At the oxidative (+1.7 V)-reductive (−1.2 V) applied voltage, the transmittance during coloring and decoloring was 13%~73%, and the device was proved to be stable even after the application cycle was repeated at least 100,000 times.

EXAMPLE 2

An electrochromic device was prepared by the same manner as described in Example 1. A eutectic mixture of acetamide and lithium trifluoromethanesulfonimide (LiTFSI) was used as electrolyte. At the oxidative (+1.7 V)-reductive (−1.2 V) applied voltage, the transmittance of the device was 13%~73%.

Tungsten oxide ($WO_3$), a reductive electrochromic material, acts as a catalyst in an organic solvent such as propylene carbonate (PC), so that it decomposes the electrolyte therein. The eutectic mixture used as the electrolyte in Example 2 was in the form of a salt which did not induce side-reaction and thus increased durability of the device.

COMPARATIVE EXAMPLE 1

An electrochromic device was prepared by the same manner as described in Example 1 except that formatting of electrode containing the lithium nickel oxide ($Li_xNi_{1-y}O$) deposited by sputtering was not performed and decoloring was repeatedly performed by on/off with the prepared device. Particularly, after preparing the device, decoloring of the electrochromic device was performed by inducing oxidation-reduction by repeating the application of oxidative-reductive voltage (+2.0 V/−2.0 V) 100 times for 20 seconds for each. The transmittance of the electrochromic device was 56% after decoloring (−1.2V) and 8% after coloring (+1.7V). Even with the same oxidative-reductive voltage application, oxidation-reduction in the electrode was not completely induced, suggesting that decoloring was incomplete. As a matter of fact, when ±2.0 V was applied to the prepared device, which means the voltage was over the acceptable actuation voltage, the device was not normally functioning.

COMPARATIVE EXAMPLE 2

An electrochromic device was prepared without heat-treatment of electrode containing the lithium nickel oxide ($Li_xNi_{1-y}O$) deposited by sputtering. The electrochromic device was prepared by the same manner as described in Example 1 except that the heat-treatment was not performed. Coloring/decoloring process of the device was repeated n times. As a result, the lithium nickel oxide ($Li_xNi_{1-y}O$) layer was separated from the electrode surface and air bubbles were generated in the device. At this time, n was $400 \leq n \leq 1000$.

INDUSTIAL APPLICABILITY

According to the present invention, formatted lithium nickel oxide was used as an electrode for an electrochromic device. As a result, the electrochromic device exhibited wider optical electrochromic range and excellent working stability compared with the device using a conventional non-formatted electrode. In addition, according to the method of the invention, time, efforts, and production costs for producing the electrochromic device were reduced. The electrode-of the invention can be applied to various fields including an electrochromic device and other electrochemical devices.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method for preparing an electrode containing lithium nickel oxide wherein nickel has a single oxidation number, which comprises the following steps:

a) preparing an electrode containing the lithium nickel oxide ($Li_xNi_{1-y}O$, $0.4<x<1$, $0<y<1$) layer formed on the conductive substrate; and b) applying oxidative voltage to the electrode, and then applying reductive voltage thereto.

2. The method according to claim 1, wherein the step b) is characterized by the alternate and repeated application of oxidative and reductive voltages in an electrochemical cell equipped with electrolyte containing lithium ion ($Li^+$) and a reductive counter electrode.

3. The method according to claim 1, wherein the acceptable range of the applied voltage in the step b) is determined not to induce the decomposition of the electrode.

4. The method according to claim 1, wherein the applied oxidative voltage in step b) is 1 V~3.2 V and the applied reductive voltage is −1 V~2.7 V.

5. The method according to claim 1, wherein the oxidative-reductive voltage is applied until the electrode is completely oxidized or reduced in the step b).

6. The method according to claim 1, wherein the application of oxidative-reductive voltage in the step b) is repeated until the electrode is completely reduced so that the light transmittance reaches at least 80% at 500 nm wavelength.

7. The method according to claim 1, wherein the step b) is performed at the temperature above 15° C. and below boiling point or decomposition temperature of the electrolyte.

8. The method according to claim 1, wherein the repeat times of the application in the step b) is 1~10.

9. The method according to claim 1, wherein the additional step of heat-treatment of the electrode containing the lithium nickel oxide ($Li_xNi_{1-y}O$, 0.4<x<1, 0<y<1) layer is included in between the step a) and the step b).

10. The method according to claim 9, wherein the heat-treatment is performed at 100~350° C. for 30 minutes~3 hours.

11. The method according to claim 1, wherein the electrode is used as an oxidative electrode of the electrochromic device.

12. An electrode containing a lithium nickel oxide ($Li_xNi_{1-y}O$, 0.4<x<1, 0<y<1) layer formed on a conductive substrate, in which nickel of the lithium nickel oxide characteristically has a single oxidation number, and the electrode is prepared by a method which comprises following steps:
 a) preparing the electrode containing the lithium nickel oxide layer formed on the conductive substrate; and
 b) applying oxidative voltage to the electrode, and then applying reductive voltage thereto.

13. The electrode according to claim 12, wherein the oxidation number is +2 or +3.

14. The electrode according to claim 12, wherein the thickness of the lithium nickel oxide layer formed on the conductive substrate is 150 nm~10 μm.

15. The electrode according to claim 12, wherein the step b) is characterized by the alternate and repeated application of oxidative and reductive voltages in an electrochemical cell equipped with electrolyte containing lithium ion ($Li^+$) and a reductive counter electrode.

16. The electrode according to claim 12, wherein the application of oxidative-reductive voltage in the step b) is repeated until the electrode is completely reduced so that the light transmittance reaches at least 80% at 500 nm wavelength.

17. The electrode according to claim 12, wherein the additional step of heat-treatment of the electrode containing the lithium nickel oxide ($Li_xNi_{1-y}O$, 0.4<x<1, 0<y<1) layer is included in between the step a) and the step b).

18. An electrochromic device comprising:
 a) a first electrode;
 b) a second electrode;
 c) an electrochromic material; and
 d) an electrolyte,
 wherein the first electrode or the second electrode contains a lithium nickel oxide ($Li_xNi_{1-y}O$, 0.4<x<1, 0<y<1) layer formed on a conductive substrate, in which nickel of the lithium nickel oxide characteristically has a single oxidation number, and
 wherein the first electrode or the second electrode is prepared by a method which comprises following steps:
  a) preparing the electrode containing the lithium nickel oxide layer formed on the conductive substrate; and
  b) applying oxidative voltage to the electrode, and then applying reductive voltage thereto.

* * * * *